3,179,663
NEW SULFURIC ACID LEUCO ESTERS
Walter Kern, Sissach, Basel-Land, Karl Glenz, Binningen, Basel-Land, Kurt Hoelzle, Liestal, Basel-Land, and Max Staeuble, Basel, Switzerland, assignors to Ciba Limited, Basel, Switzerland, a company of Switzerland
No Drawing. Filed May 23, 1962, Ser. No. 196,874
Claims priority, application Switzerland, May 26, 1961, 6,143/61; May 11, 1962, 5,731/62
7 Claims. (Cl. 260—249)

The present invention relates to new and valuable sulfuric acid leuco esters of vat dyestuffs containing at least one appropriately substituted sulfonic acid group or sulfamide group, primarily an alkyl sulfone group or sulfonic acid-N-(hydroxyalkyl- or sulfatoalkyl)-amide group substituted by a hydroxyl group or a sulfato group, especially of vat dyestuffs having at least two anthraquinone radicals or more than four fused rings.

As used here, the term "vat dyestuffs" comprises dyestuffs which are converted by reduction into the so-called leuco-form or vat, which latter has a greater affinity for natural or regenerated cellulose fibers than the unreduced form, and which can be reconverted into the original chromophore by oxidation.

Vat dyestuffs of the anthraquinone series include not only derivatives having an anthraquinone nucleus, but also derivatives containing further fused-on or fused-in carbocyclic or heterocyclic rings, or which consist of two or more anthraquinone units linked together directly or e.g. through an —NH— bridge, a —CH=N=N=CH— bridge, an alkylene or arylene-diamine bridge, or through a di- or polycarboxylic acid radical, or through one or several imidazole, triazole, triazine, cyameluric acid, pyrimidine, quinazoline, oxazole, thiazole, or oxdiazole rings.

Examples of anthraquinone vat dyestuffs are:

benzthiophanthraquinone,
anthrapyrimidines,
anthrapyridones,
isothiazolanthrones,
quinazolanthraquinones,
oxazolanthraquinones,
thiazolanthraquinones,
oxidazolanthraquinones,
anthraquinoyltriazoles,
acylaminoanthraquinones,
acylaminothiophananthraquinones,
pyrazolanthraquinones,
dipyrazolanthronyles,
pyrazinoanthraquinones,
hydrazones,
azomethines,
azaanthraquinones,
azabenzanthrones,
anthraquinonacridones,
indanthrones,
thioxanthonanthraquinones,
anthrimides,
anthrimide carbazoles,
dihydroacridines,
anthanthrones,
pyranthrones,
dibenzpyrenequinones,
dibenzanthrones,
isodibenzanthrones,
flavanthrones,
acedianthrones, phthaloyl compounds of polynuclear hydrocarbons, and also sulfur-containing vat dyestuffs obtained by sulfurization of mono- or polynuclear anthraquinone derivatives.

Apart from a substituent of the kind mentioned, the dyestuffs may contain substituents usual in vat dyes, such e.g. as halogen atoms, alkoxy groups or acylamino groups.

The sulfuric acid leuco esters of the invention are obtained by esterifying by means of sulfatizing agents the leuco compounds of corresponding vat dyestuffs containing at least one sulfone group or sulfamide group substituted as shown above.

The conversion of vat dyestuffs into the corresponding sulfuric acid leuco esters is known per se and can be performed e.g. in two stages, the first consisting in the preparation of the leuco compound and the second in the treatment of the latter with a sulfatizing agent. Under the industrial processes used so far, however, the vat dyestuff is treated in a suitable sulfatizing agent with a compound having a reducing action, preferably a metal, e.g. in a state of fine distribution. These two methods can also be employed in the present process if, in determining the quantity of sulfatizing agent to be used, the fact is taken into account that apart from the hydroxyl groups formed as a result of the reduction of keto groups, other esterifiable hydroxyl groups are present. Per se known sulfatizing agents are used also in the new process, e.g. chlorosulfonic acid, sulfur trioxide and sulfur trioxide adducts of tertiary amines, such as pyridine, picoline, lutidine, etc., or amides, such as dimethyl formamide or dimethylacetamide. Alternatively, the esterification according to the present invention can be performed simultaneously with the preparation of the leuco compound by reacting for example a vat dyestuff containing a sulfone group or sulfamide group in the presence of at least one finely divided metal, e.g. iron, cobalt, nickel, zinc, copper or cuprous alloy, with sulfur trioxide or a compound yielding sulfur trioxide in the presence of a tertiary amine, such as, for example, pyridine, picoline, lutidine, dimethyl aniline, diethyl aniline, diethylcyclohexylamine, or an amide, such as dimethyl formamide or dimethyl acetamide, or a mixture of such substances, if desired in the presence of an inert liquid diluent. Dimethyl formamide may also be used in this connection.

In this reaction, the starting materials containing one or two hydroxyalkyl sulfone groups or sulfamide groups, e.g. of the formula

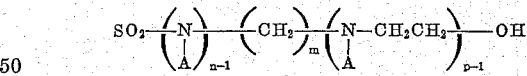

in which $m$ represents a whole number of at the most 3, $n$ and $p$ each represents a whole number of at the most 2, and A a hydrogen atom, a lower alkyl group or a lower hydroxyalkyl group, can be converted into the corresponding derivatives having an esterified hydroxyl group, that is to say, into the corresponding sulfatoalkyl derivatives.

If desired, the present process may be carried out in two stages by converting in the first stage only the outer hydroxyl groups, those bound to alkyl groups, into sulfato ester groups, and in the second stage converting the esterified dystuff into the sulfuric acid leuco ester.

According to a modification of the process the resulting sulfuric acid leuco esters, provided they contain an acylatable amino group, can be acylated at the amino group with an acylating agent, such as benzoyl chloride, dicarboxylic acid halide, cyanuric chloride, or the like.

The sulfuric acid leuco esters of vat dyestuffs containing sulfone groups and/or sulfamide groups, especially those with at least two anthraquinone nuclei or more than four fused rings, are suitable for dyeing a wide variety of materials, such as wool, polyamide fibers, and especially for dyeing and printing textile materials of natural or regenerated cellulose by the so-called direct dyeing or exhaust method, or by the printing or the padding method, after which the dyestuffs, if they contain a grouping capable of reacting with the fiber or with itself (sulfatoalkyl sulfone group or sulfonic acid-N-(sulfatoalkyl)-amide group), are chemically fixed on the fiber by means of alkali, if desired with the concomitant use of a reducing agent, and the application of heat, e.g. by steaming.

As regards chemical structure, the present sulfuric acid leuco esters of vat dyestuffs differ from the known sulfuric acid leuco esters, in which normally two hydroxyl groups formed by reduction of the keto compounds, are converted into the sulfato ester grouping, by their containing in addition at least one, preferably two or more, outer hydroxyl alkyl groups converted into sulfato esters. This fact alone results in increased solubility and, moreover, other differences in the behavior in the dissolved state, which in actual practice amounts to an advantage. As to the possibilities of application for the new dyes, there are essential differences in the following respect:

The known sulfuric acid leuco esters of vat dyestuffs can be fixed on the fiber practically only by precipitating the vat dyestuff as a pigment from the solution of the ester—by acid oxidation. This can also be done with the new leuco esters. What is of particular importance, however, especially with a view to combined dyeing operations involving dyestuffs of other groups, is that the new leuco esters can be fixed on the fiber advantageously in an alkaline medium. In such operations, the dyebaths or printing pastes may contain reducing agents, such as are usual with vat dyestuffs, or mild reducing agents, such as sodium sulfide or sodium hydrogen sulfide. This permits of the dyeings to be soaped after the alkaline fixation, any dyestuff not fixed on the fiber being removed, leaving only the dyestuff that is chemically fixed to the fiber and that has the high fastness to solvents and to migration. It was also observed that in the case of the leuco derivatives which are easy to develop reoxidation takes place as early as during the soaping at the boil. Nevertheless, development with an acid oxidant (e.g. nitrite and sulfuric acid), usual for sulfuric acid leuco ester dyeings, is indicated.

The dyeings and prints obtained with the dyestuffs of this invention excel by their very good fastness properties in addition to meeting the usual requirements. Moreover, many of them produce much-desired shades.

Most of the dyeings obtained with the new dyestuffs are fast to dry cleaning and to migration. The dyed fabrics can therefore be coated with artificial resins, for example, polyvinyl chloride without the dyestuff migrating into the coating. This feature is particularly welcome in the manufacture of artificial leather.

The following examples illustrate the invention. Unless otherwise stated, parts and percentages are by weight, parts by weight and parts by volume bearing the same relation as does gram to cubic centimeter.

EXAMPLE 1

35 parts of chlorosulfonic acid are added, while cooling, to a mixture of 167.5 parts of α-picolin and 61.5 parts of N,N-diethylamino-cyclohexane. 35.1 parts of isodibenzanthrone-disulfonic acid-N,β-hydroxyethylamide are the added. At room temperature, 16.7 parts of copper powder are added, the whole heated to 50° C. while stirring, then maintained at that temperature for 4 hours. The reaction mixture is stirred in about 1700 parts of a sodium carbonate solution of 4% strength, and the mixture of bases distilled under reduced pressure at 50–55° C. The batch is then diluted with 1500 parts of hot water, filtered, and the filtrate salted out with about 20% of sodium chloride. The reddish-brown tetra-ester of the formula

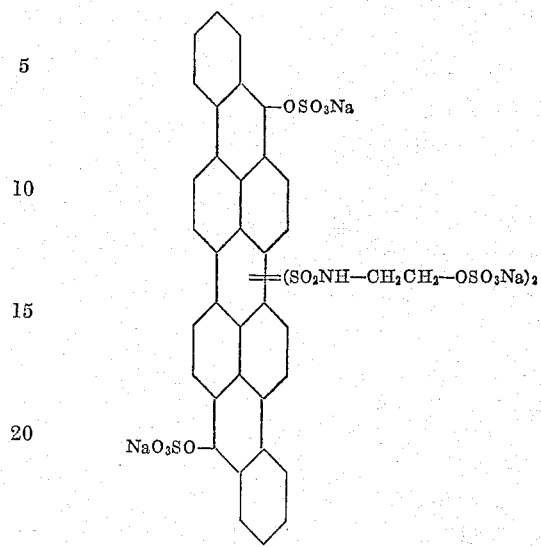

which precipitates is isolated by filtration and can be worked up in the moist state.

The same tetra-ester is obtained when, instead of the 35.1 parts of the isodibenzanthrone-disulfonamide mentioned, there are used 43.1 parts of the dyestuff which has this constitution (e.g. in the form of the dialkali metal salt):

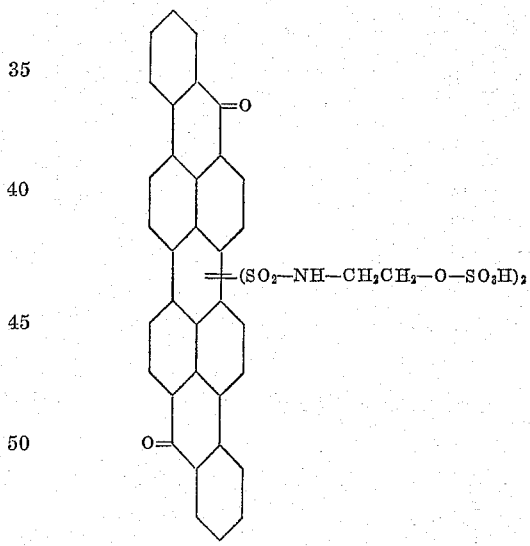

Cotton and regenerated cellulose are dyed very fast reddish blue tints by the thermofixation process with the concomitant use of sodium sulfide.

The isodibenzanthrone disulfamide used can be made for example as follows:

11.4 parts of isodibenzanthrone are introduced into 210 parts of chlorosulfonic acid at 20–25° C. and the mixture is stirred at that temperature for 1 hour. It is then heated at 70–75° C. until a test portion is soluble in 10% aqueous pyridine, which is the case after about 5 hours. The batch is then carefully poured onto ice, the sulfochloride which precipitates is filtered off with suction and washed with ice-water.

The isodibenzanthrone disulfochloride so obtained from 11.4 parts of isodibenzanthrone is suspended in the form of a moist filter cake in 700 parts of ice-water, and at 0–5° C. treated with 300 parts of monoethanolamine. The whole is stirred at 0–5° C. for about 2 hours, then allowed to rise gradually to room temperature, and stirred on for 15 hours. The mixture is then heated at 60–65° C. for 1 hour, filtered with suction while still warm, washed with water until the washings are neutral, and dried.

Dyeing Prescription I (pad-steam)

2 parts of dyestuff are dissolved in 100 parts of water. With the resulting solution, a cotton fabric is impregnated at 20° C. in a padder, and the excess liquor squeezed off so that the fabric retains 75% of its weight of dyestuff solution. The fabric so impregnated is dried, then impregnated at room temperature with a solution containing per liter 10 grams of sodium hydroxide and 300 grams of sodium chloride, squeezed to a liquid uptake of 75%, and steamed for 60 seconds at 100 to 101° C., then oxidized for 15 minutes in a bath containing, per liter, 10 g. of $NaNO_2$ and 50 cc. of $H_2SO_4$ of 10% strength. The fabric is rinsed, treated in a 0.5% sodium bicarbonate solution, rinsed, soaped at the boil for a quarter of an hour, rinsed again, and dried.

Dyeing Prescription II (pad-steam plus reducing agent)

8 parts of dyestuff (20% paste) are dissolved in 100 parts of water. With this solution, 10 parts of cotton satin are padded twice at room temperature with a liquid retenton of 75% each time. The material is subjected to an intermediate drying operation for 15 minutes at about 50° C. It is then padded twice at room temperature in a solution containing 25 parts of sodium chloride, 5 parts of $Na_2S$ of 60% strength, 1 cc. of sodium hydroxide solution of 36° Bé. in 100 parts of water; calc.=66%. The material is then steamed at 100–101° C. for 60 seconds and, without intermediate drying, oxidized for 15 minutes in a bath containing, per liter, 10 g. of $NaNO_2$ and 50 cc. of $H_2SO_4$ of 10% strength, then rinsed, soaped at the boil with the additon of 1 g. per liter of a non-ionic deter- of 10.8 parts of m-aminobenzenesulfonic acid-(β-hydroxy-

EXAMPLE 2

5 parts of dibenzanthrone-disulfonic acid-N,β-hydroxyethylamide, and then 4 parts of iron powder are introduced into an adduct of 10 parts of chlorosulfonic acid and 50 parts of α-picolin. The reaction mixture is slowly heated to 50° C. and stirred for about 5 hours at that temperature. When the esterification mixture has cooled, it is introduced into an excess of 15% sodium carbonate solution, freed from α-picolin by vacuum distillation, and separated from insoluble matter by filtration. The sulfuric acid leuco ester of the formula

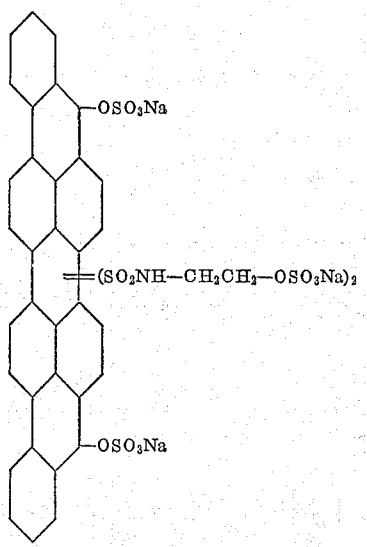

can be salted out of the solution by the addition of sodium chloride, and dried under reduced pressure.

Cotton and regenerated cellulose are dyed navy blue tints of very good fastness by the procedure described in Example 1.

The dibenzanthrone-disulfonic acid-N,β-hydroxyethylamide used in this example can be obtained from dibenzanthrone in a manner analogous to that shown in Example 1 for isodibenzanthrone.

EXAMPLE 3

Dichlorisodibenzanthrone - N,β - hydroxyethylamide of the formula

[Dichlorisodibenzanthrone]=$(SO_2NH-CH_2CH_2-OH)_2$ is converted into the leuco ester dyestuff as described in Example 2, and isolated.

Cotton and regenerated cellulose are dyed according to the dyeing prescription given in Example 1 to obtain brilliant violet tints.

The dichlorisodibenzanthrone-N,β - hydroxyethylamide can be prepared from dichlorisodibenzanthrone in the manner described in Example 1 for isodibenzanthrone, provided the sulfochlorination is performed under somewhat more severe conditions, for example at 110–120° C.

EXAMPLE 4

When instead of monoethanolamine an equivalent quantity of one of the amines mentioned in column II of the table below is caused to act on isodibenzanthrone-disulfochloride, there is obtained a dyestuff which after conversion into the corresponding sulfuric acid leuco ester with simultaneous esterification of the hydroxyalkyl groups, dyes cotton the shade indicated in column III.

| I | II | III |
|---|---|---|
| 1 | $H_2N-CH_2CH_2-NH-CH_2CH_2-OH$ | Blue-violet. |
| 2 | $H_2N-CH_2CH_2CH_2-\underset{\underset{CH_3}{\mid}}{N}-CH_2CH_2-OH$ | Violet-blue. |
| 3 | $H_2N-CH_2CH_2CH_2-N\begin{cases}CH_2CH_2-OH\\CH_2CH_2-OH\end{cases}$ | Violet. |

EXAMPLE 5

2.5 parts of benzoic acid-m-sulfochloride are suspended in 50 parts of anhydrous nitrobenzene. There are then added 1.8 parts of thionyl chloride and 0.1 part of anhydrous pyridine, and the benzoic acid-m-sulfochloride converted into the corresponding disulfochloride by heating for 2 hours at 90–95° C.

3.1 parts of the dyestuff intermediate of the formula

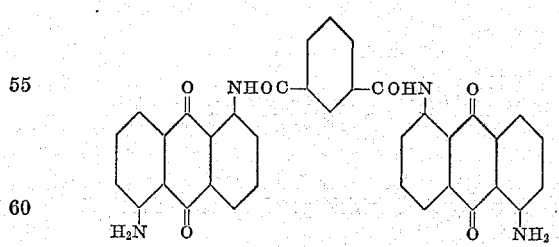

obtainable by condensing isophthalic acid dichloride with 1-amino-5-nitroanthraquinone and subsequent reduction, are dissolved in 100 parts of boiling nitrobenzene. After cooling to 130° C., the above-mentioned solution of benzoic acid sulfonic acid dichloride is added and the whole acylated while stirring for 4 hours at 120–125° C. and for 1 hour at 140–145° C. After cooling, the acylation product is isolated by filtration, and the filter residue suspended in 100 parts of nitrobenzene. After that, while stirring at a temperature of 95–100° C., the solution of 5 parts of monoethanolamine in 20 parts of chloroform is added dropwise. Stirring is continued at that temperature for 10 hours and, after cooling, the dyestuff of the formula

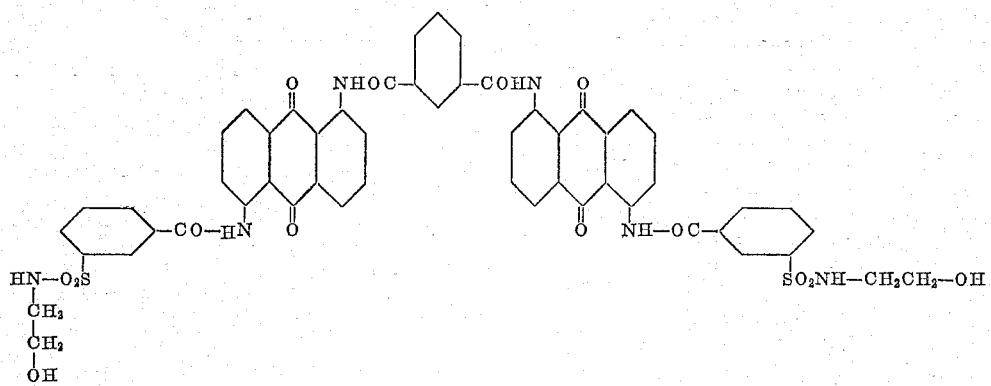

is isolated by filtration, washed with acetone and water, and dried under reduced pressure at 70° C.

*Esterification*

80 parts of α-picolin and 20 parts of diethyl cyclohexyl-amine are stirred, and 10 parts of chlorosulfonic acid added dropwise while cooling. 5 parts of dyestuff and 3 parts of brass powder are added, and the whole heated at 50° C. for 4–5 hours. The reaction mixture is then poured into an excess of sodium carbonate solution, and the mixture of bases distilled off under reduced pressure. The aqueous solution is separated from the precipitated residue, the latter stirred with 7 parts of sodium hydroxide of 30% strength and 200 parts of water at 40–50° C. Insoluble matter is separated by filtration and, the solution concentrated under reduced pressure, and the ester isolated by salting out.

Cotton and regenerated cellulose are dyed yellow shades having good properties of fastness by the method described in Example 1.

EXAMPLE 6

A suspension of 2.0 parts of the dyestuff intermediate of the formula

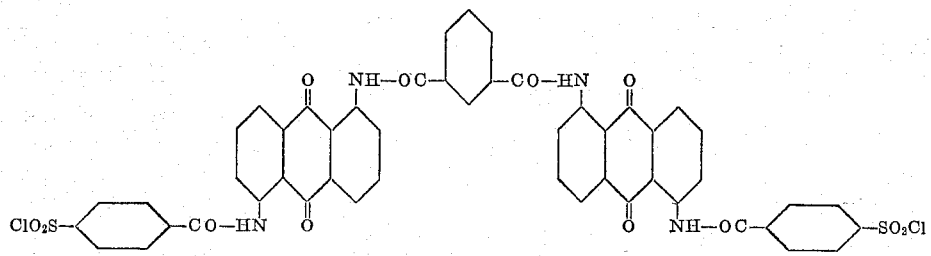

in 30 parts of nitrobenzene and 5 parts by volume of N,N'-diethylaniline is treated with 1.0 part of 4-amino-phenyl-(β-hydroxy-ethyl)-sulfone and 0.2 part anhydrous sodium carbonate, stirred for 1 hour at 165° C., and cooled. The dyestuff which precipitates probably has the formula It is thoroughly boiled in 80% ethanol, filtered with suction, and dried. When dry, the product is a brown powder which is soluble in alkalis and is free from chlorine.

The dyestuff is esterified as described in Example 5. By the method described in Example 1, it dyes cotton reddish yellow shades.

EXAMPLE 7

A suspension of 2.24 parts of the dyestuff intermediate of the formula

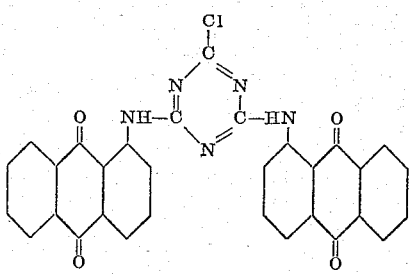

in 16 parts of nitrobenzene is treated with 1.6 parts of 4-aminophenyl - (β - hydroxy - ethyl) - sulfone, the mixture stirred for 16 hours at 175° C., cooled, and diluted with

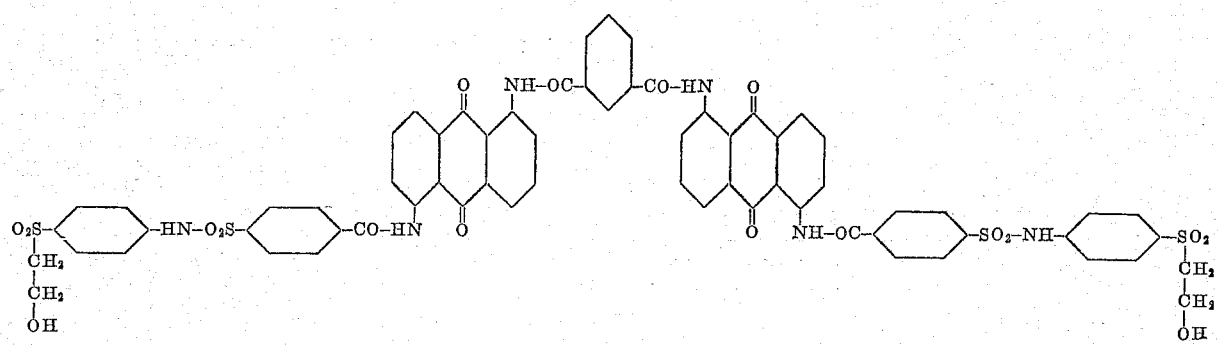

30 parts by volume of ethanol. The dyestuff of the probable formula

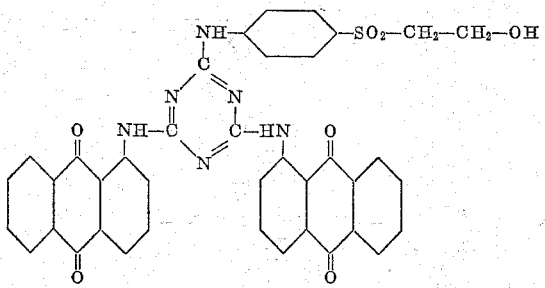

precipitates readily. It is boiled in ethanol for a short while, filtered off and dried. The product is obtained in good yield, and is a dark yellow powder free from chlorine.

The dyestuff is esterified as described in Example 5. It dyes cotton by the procedure described in Example 1 fast yellow shades.

EXAMPLE 8

13.5 parts of the compound of the formula

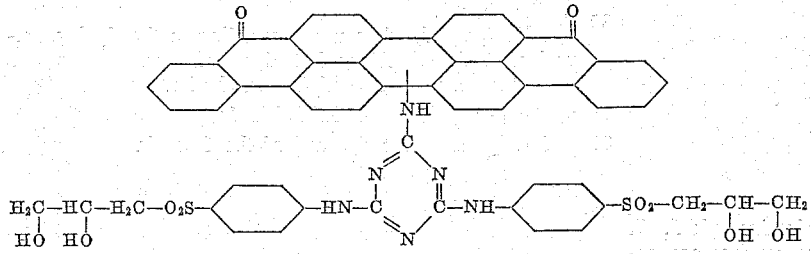

are dissolved at room temperature in 1215 parts of 100% sulfuric acid. The mixture is then carefully poured into about 4850 parts of ice-water, and filtered. The moist filter cake is slurried in about 1350 parts of water and rendered exactly neutral with 10% sodium hydroxide. After the addition of 16 parts of sodium chloride, the product is filtered off and dried under reduced pressure at 60–70° C. The new dyestuff corresponds, in the form of the free acid, to the formula

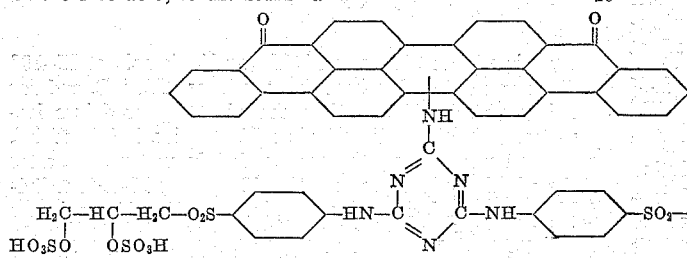

and when dry is a black, carbon-like product. The starting material can be obtained as follows:

A fine suspension of 2.48 parts of the compound of the formula

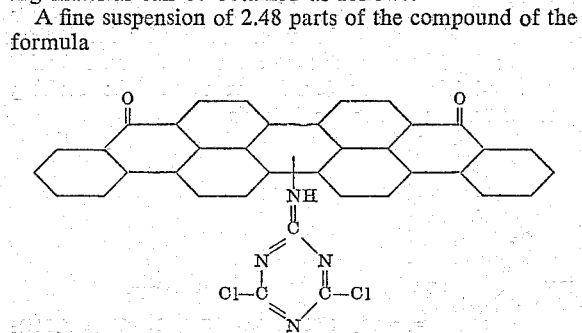

in 100 parts of nitrobenzene and 5 parts by volume of N,N'-diethyl-aniline is treated with 3.6 parts of 4-amino-phenyl-(β,ω-dihydroxypropyl)-sulfone and 0.6 part of an-hydrous sodium carbonate, then stirred for 3 hours at 150° C. and for 15 hours at 165° C. Another 3.6 parts of 4-amino-phenyl-(β,ω-di-hydroxy-propyl)-sulfone are then added, the whole stirred for 24 hours at 170° C., and cooled. The dyestuff is isolated and thoroughly boiled in 60% ethanol, filtered with suction and dried. When dry, it is a black powder free from chlorine.

The dyestuff has the same properties, whether esterified as sulfuric acid ester or as hydroxylalkyl compound according to the method described in Example 2. It dyes cotton and regenerated cellulose by the procedures described in Example 1 fast blue-gray shades.

EXAMPLE 9

4.57 parts of 5,5'-diamino-1,1'-dianthrimide carbazole are ground in a ball mill for several hours with 90 parts by volume of anhydrous nitrobenzene. The resulting paste is transferred into the reaction vessel with 100–150 parts by volume of anhydrous nitrobenzene, then 0.2 part by volume of anhydrous pyridine added, and the mixture heated to 120° C. There is then added dropwise the solution in 50 parts by volume of nitrobenzene of the benzoylchloride-m-sulfochloride freshly prepared from 8.82 parts of benzoic acid-m-sulfochloride and thionyl chloride. The reaction mixture is stirred for 24 hours at 120–130° C. Cooling is followed by filtering with suction, washing with benzene, ethanol and petroleum ether, and drying at 50–60° C. under reduced pressure. The resulting product of the formula

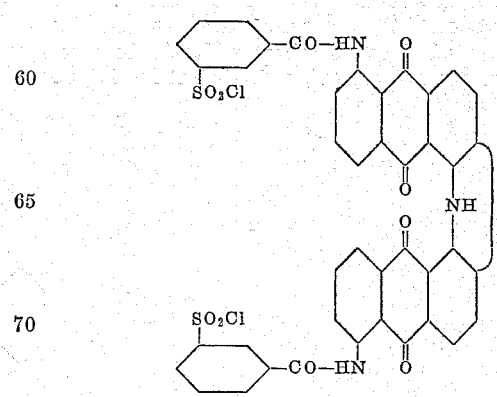

is reacted with monoethanolamine.

4.31 parts of the substance of the above formula are ground in a ball mill for several hours with 70 parts by volume of anhydrous nitrobenzene, flushed into the reaction vessel with 100 parts by volume of nitrobenzene, heated to 100° C., and 6.1 parts of monoethanolamine added dropwise. When the addition is complete, the mixture is heated to 150–155° C. and stirred at that temperature for 24 hours. The temperature is then raised to, and maintained at, 160–170° C. for 3 hours, the batch then cooled to 100° C., rapidly filtered with suction, washed in turn with nitrobenzene, benzene, ethanol, and finally with water, and dried at 50–60° C. under reduced pressure. The resulting dyestuff of the formula

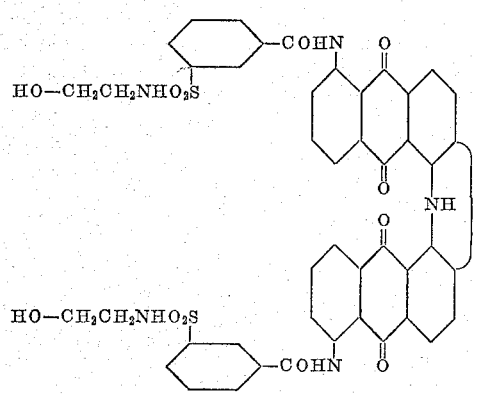

is esterified by the procedure described in Example 5. It dyes cotton and regenerated cellulose very fast orange-yellow shades.

EXAMPLE 10

4.21 parts of monoaminoacedianthrone are ground in a ball mill with 70 parts by volume of anhydrous nitrobenzene for several hours, flushed into the reaction vessel with 140 parts by volume of nitrobenzene, 1 part by volume of anhydrous pyridine added, and the batch heated to 170–180° C. After that, a solution of 1.06 parts of cyanuric chloride in 10 parts by volume of nitrobenzene is added and the reaction mixture stirred at 170–180° C. for 24 hours. After cooling, the product is filtered with suction and washed several times with anhydrous nitrobenzene.

The filter cake is slurried in 200 parts by volume of anhydrous nitrobenzene, heated to 100° C., and a solution of 10.8 parts of m-aminobenzenesulfonic acid-(β-hydroxyethyl)-amide in 60 parts by volume of nitrobenzene added dropwise. When the addition is complete, the batch is heated to 140–150° C. and stirred at that temperature for 20 hours. After that, the temperature is raised to 160–170° C. and maintained at this level for 4 hours. The batch is then allowed to cool to 100° C., filtered rapidly with suction, washed several times with nitrobenzene, then with benzene and ethanol, and dried at 50–60° C. under reduced pressure. The resulting dyestuff of the formula

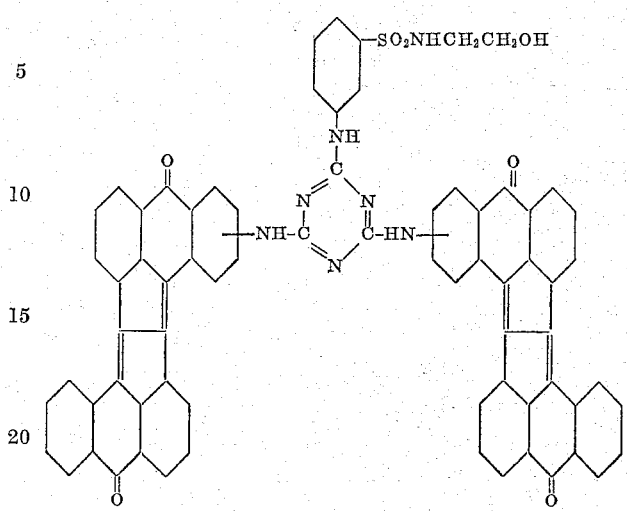

is converted into the leuco ester by the method described in Example 5.

This dyestuff, when used according to the dyeing prescriptions given in Example 1, dyes cotton and regenerated cellulose very fast reddish-brown shades.

EXAMPLE 11

34.5 parts of the dyestuff of the formula

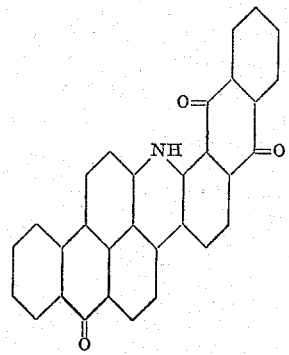

are stirred into 650 parts of chlorosulfonic acid at 15–20° C. The mixture is stirred for one hour at 20° C. and for 2 hours at 40–45° C., then cooled and poured into ice-water. The dyestuff sulfonic acid chloride is filtered off, washed with water, then suspended in water and, after the addition of ice, treated with 100 parts of 1-(N-methyl-N,β-hydroxyethyl)-aminopropylamine-(3). The mixture is stirred for 3 hours at 0–5° C., for 15 hours at 20° C., for 2 hours at 60–70° C., and sodium chloride is then added until the mixture contains 5% of it. The precipitate is filtered off, washed with 5% sodium chloride solution, suspended again in water, acidified with hydrochloric acid, filtered once more, and finally washed with water, and dried at 75° C. under vacuum. The resulting product corresponds to the formula

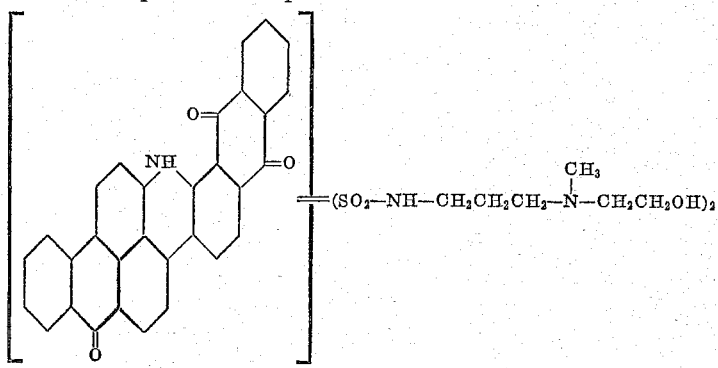

It is esterified according to Example 2. The dyestuff dyes cotton and regenerated cellulose by the procedures described in Example 1 fast olive shades.

When in Example 1, the amine there mentioned is replaced by 100 parts of N-(β-hydroxyethyl)-ethylene-diamine, the product of the formula

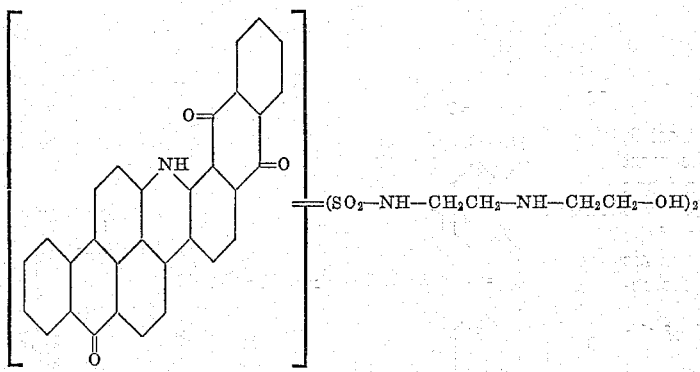

is obtained which, after being esterified, dyes cotton and regenerated cellulose bluish olive tints.

EXAMPLE 12

40.8 parts of the dyestuff of the formula

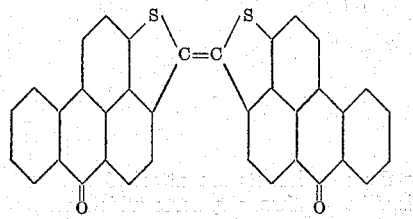

are introduced at 15–20° C. with stirring into 730 parts of chlorosulfonic acid, and the mixture stirred at 20° C. for 20 hours. The mixture is poured onto ice to precipitate the dyestuff sulfonic acid chloride. The latter is filtered off, washed with water, and suspended again in water.

After the addition of 100 parts of N-(β-hydroxyethyl)-ethylene-diamine, the mixture is stirred at 0–5° C. for 3 hours, at 20° C. for 12 hours, and at 60–70° C. for 2 hours. The precipitate which forms is filtered off, washed with water, and dried at 60–70° C. under reduced pressure.

The product which is obtained in good yield corresponds to the formula

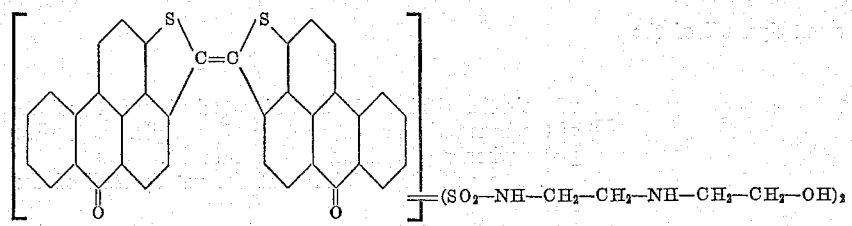

and it is esterified according to Example 2. It dyes cotton and regenerated cellulose by the procedures described in Example 1 clear turquoise blue shades.

*Printing Process I*

10 parts of the dyestuff according to Example 2 and 50 parts of urea are dissolved in 400 parts of water, and mixed with 500 parts of alginate thickening with the addition of 40 parts of anhydrous sodium carbonate. A cotton fabric is printed with the resulting paste on a roller printing machine and dried.

The material is then steamed in a Mather-Platt apparatus for 8 minutes, and oxidized in the usual manner with sodium nitrite and sulfuric acid at 70° C., rinsed, neutralized, rinsed, and soaped at the boil. There is obtained a fast blue print.

When instead of the 10 parts of the dyestuff according to Example 2, 20 parts of the dyestuff according to Example 11 or 20 parts of the dyestuff according to Example 12 are used, there is obtained a gray or bluish green print, respectively.

*Printing Process II*

When the material printed according to Printing Process I is subjected for 4 minutes to a dry heat of 150° C. and then after-treated in the manner described, very similar prints are obtained.

What is claimed is:

1. The sulfuric acid leuco ester of a vat dyestuff containing as the vattable radical a member of the group consisting of dibenzanthrone, isodibenzanthrone, a ring system of the formula

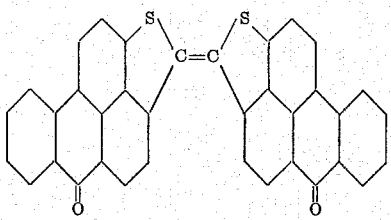

and a ring system of the formula

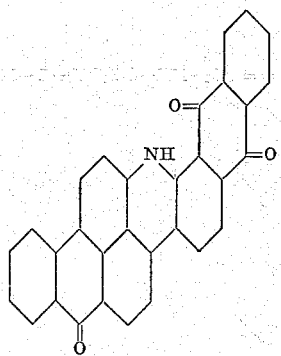

containing in direct linkage to the vattable radical two substituents of the general formula

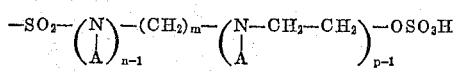

wherein $m$ represents a whole number of at the most 3, $n$ and $p$ each represents a whole number of at the most 2 and A is a member selected from the group consisting of hydrogen, lower alkyl and lower hydroxyalkyl-sulfato wherein the said substituents occupy those positions of the respective ring system which are occupied by sulfonic acid chloride groups when di-chloro sulfonating the respective compounds.

2. The sulfuric acid leuco the the vat dyestuff of the formula

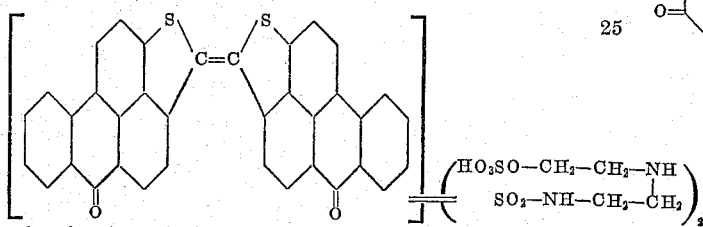

wherein the substituents occupy those positions in the ring system which are occupied by sulfonic acid chloride groups when dichloro sulfonating the said compound.

3. The sulfuric acid leuco of the vat dyestuff of the formula

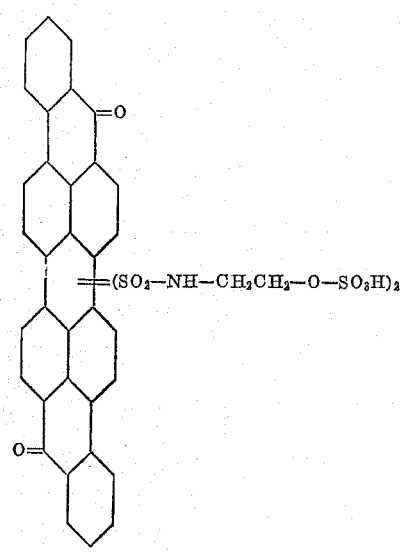

wherein the substituents are attached to those positions of the isodibenzanthrone systems which are occupied by sulfonic acid chloride groups on di-chloro sulfonation of isodibenzanthrone.

4. The sulfuric acid leuco of the vat dyestuff of the formula

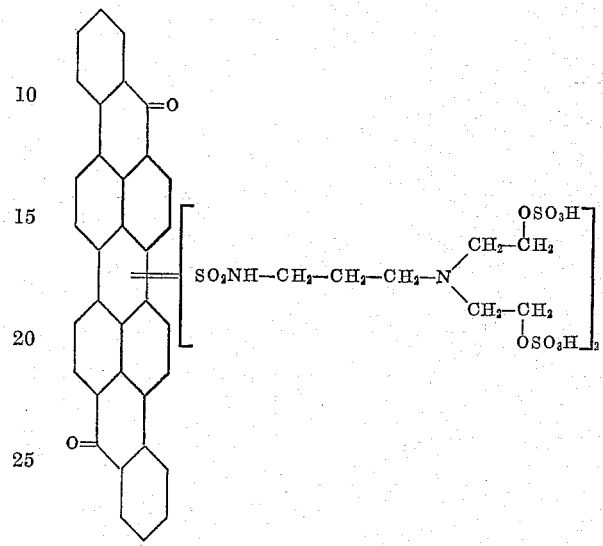

wherein the substituents are attached to those positions of the isodibenzanthrone systems which are occupied by sulfonic acid chloride groups on di-chloro sulfonation of isodibenzanthrone.

5. The sulfuric acid leuco of the vat dyestuff of the formula

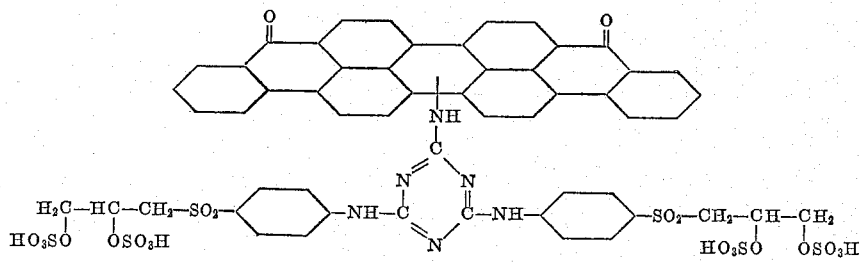

wherein the triazine substituent is attached to that position of the benzanthrone system which is occupied by a nitro group when mono nitrating benzanthrone.

6. The sulfuric acid leuco of the vat dyestuff of the formula

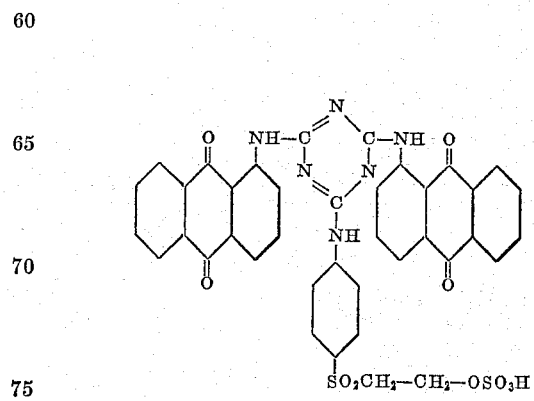

7. The sulfuric acid leuco of the vat dyestuff of the formula

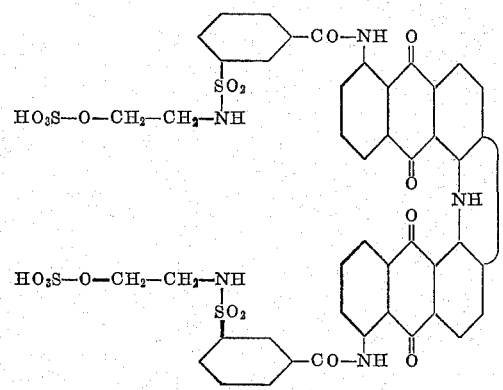

References Cited by the Examiner
UNITED STATES PATENTS

| | | | |
|---|---|---|---|
| 1,483,084 | 2/24 | Green et al. | 260—371 |
| 2,163,146 | 6/39 | Kumetat et al. | 260—372 |
| 2,283,326 | 5/42 | Felix et al. | 260—163 |
| 2,355,497 | 8/44 | Zwilgmeyer | 260—246 |
| 2,386,309 | 10/45 | Gutzwiller | 260—379 |
| 2,575,463 | 11/51 | Ogilvie et al. | 260—329.2 |
| 2,586,233 | 2/52 | Kern et al. | 260—316 |
| 2,709,168 | 5/55 | Jenny et al. | 260—368 |
| 2,730,534 | 1/56 | Hoefle et al. | 260—373 |
| 2,918,475 | 12/59 | Oppliger et al. | 260—316 |

OTHER REFERENCES

Lubs: "Chemistry of Synthetic Dyes and Pigments," Reinhold Pub. Corp., 1955, pp. 372–373.

IRVING MARCUS, *Primary Examiner.*

NICHOLAS S. RIZZO, WALTER A. MODANCE, *Examiners.*